April 26, 1966
P. E. ALLEN
3,248,581
OSCILLATING ELECTROMAGNETIC MOTOR
WITH MOTION CONVERSION MEANS
Filed March 14, 1963
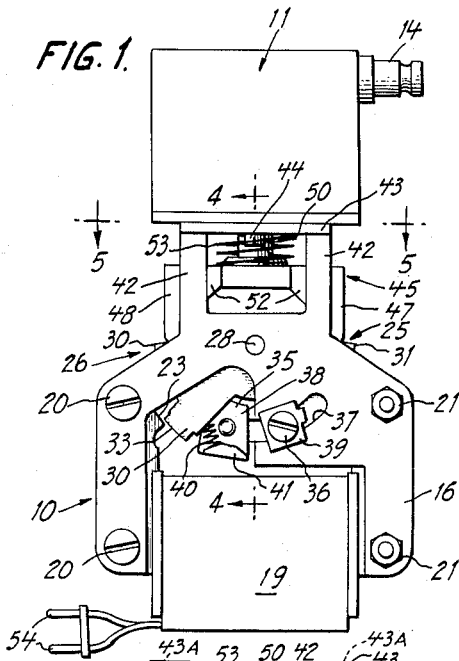
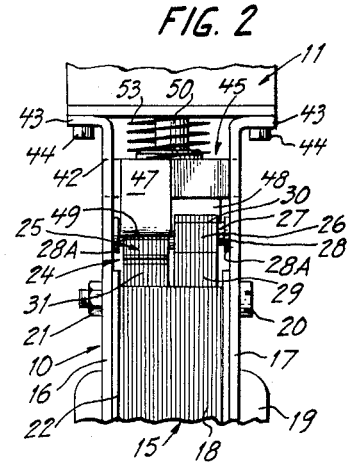
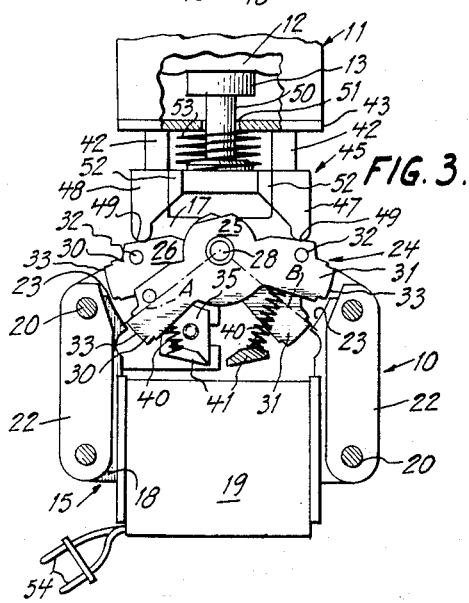
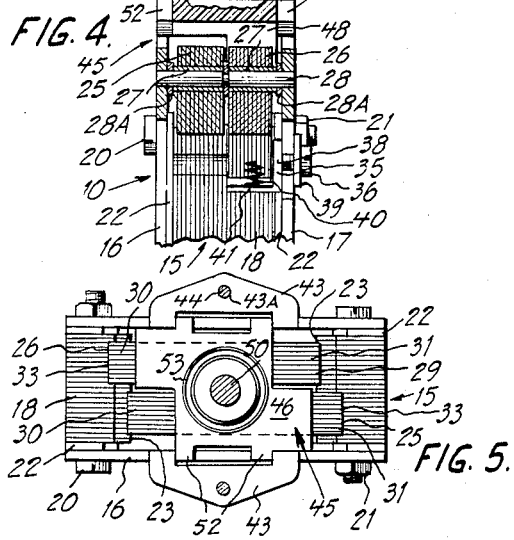
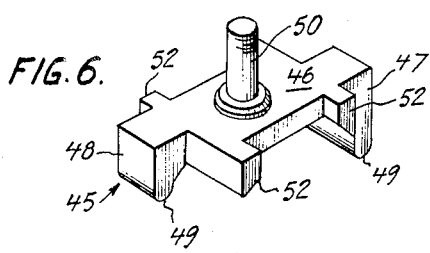
INVENTOR.
PAUL E. ALLEN
BY *[signature]*
ATTORNEY

# United States Patent Office 3,248,581
Patented Apr. 26, 1966

3,248,581
OSCILLATING ELECTROMAGNETIC MOTOR
WITH MOTION CONVERSION MEANS
Paul Eric Allen, Newtown, Conn., assignor to Sperry
Rand Corporation, New York, N.Y., a corporation of
Delaware
Filed Mar. 14, 1963, Ser. No. 265,132
7 Claims. (Cl. 310—37)

This invention relates to motor driven devices and more particularly to devices in which the motion transmitted by a prime mover is changed from one type of motion to another type motion.

Many small motor-operated electrical appliances utilize vibratory motors which are inexpensive and efficient for the purpose to which the appliance is put. The motion of such motors, as reflected from the movement of the armature thereof, is oscillatory in nature. Generally, an arm is provided on the armature which transmits such oscillatory motion to connecting mechanism to ultimately effect different types of motions, such as linear and rotational motions, depending upon the arrangements of the elements constituting the connecting mechanisms. In some appliances, it is desired to convert oscillatory motion to linear, for example shavers, wherein the oscillatory motion of the armature is imparted to a movable cutter to provide linear or reciprocatory movement thereof in a path substantially tangent to the arc defined by a point or points on the armature arm. Difficulty is experienced however, where it is desired to provide a simple connection or mechanism which effects linear or reciprocatory movement of a member in a path which lies normal to a path tangent to an arc described by the armature or which first path intersects the center of oscillation. Further difficulties are encountered in resolving problems associated with dual armature vibratory motors wherein the armatures move oppositely to each other and it is desired to move a member linearly in a path intersecting the center of oscillation or extending normal to a path tangent to the arc generated by the armatures.

An object of this invention is to provide novel means for converting oscillatory motion to linear motion.

Another object is to provide novel means which converts the oscillatory movement of a member to linear movement of a second member in a path which intersects the center about which the first member oscillates or which lies normal to a path tangent to an arc described by the first member.

A further object is to provide a novel mechanism for vibratory motors which translates the oscillatory movement of the motor armature to a linear or reciprocatory movement of an output member associated therewith.

A further object is to provide a novel translatory drive mechanism for interconnection with the armature assembly of a vibratory electric motor and a driven member, and which mechanism is comprised of relatively few, economical and simplified parts and which parts are interconnected with the armature assembly and driven member.

Still another object is to provide a novel mechanism for vibratory motors which employ two armatures oscillatable in opposite directions and wherein such motion is converted into reciprocatory motion of a member disposed in a path intersecting the center of oscillation or a path normal to a path tangent to the arc described by the armatures.

The present invention contemplates novel means for converting oscillatory motion of the armature assembly of a motor to linear motion. In the preferred embodiment wherein the armature of a vibratory electric motor has dual armatures each oscillating in an opposite direction, there is provided a motion converting member having legs each of which engages one of the two armatures. A spring system is provided whereby each leg of the motion converting member is kept in engagement with its armature and which member is thereby reciprocated in a linear path intersecting the center of oscillation of the armatures such as a path extending normal to a path tangent to the arc generated by the oscillatory movement of the armatures.

The above and other objects and advantages of the present invention will appear more fully hereinafter from a consideration of the detailed description which follows taken together with the accompanying drawing wherein one embodiment of the invention is illustrated.

In the drawing:

FIG. 1 is a front elevational view of a vibratory electric motor and compressor assembly and which assembly incorporates the subject invention;

FIG. 2 is a fragmentary end view of the assembly shown in FIG. 1;

FIG. 3 is a fragmentary elevational view of the assembly shown in FIG. 1 with one of the motor frame plates removed;

FIG. 4 is a fragmentary sectional view taken on the lines 4—4 of FIG. 1;

FIG. 5 is a sectional view taken on the line 5—5 of FIG. 1; and

FIG. 6 is a perspective view of the motion converting member.

Referring now to the drawing for a more detailed description of the present invention and more particularly to FIG. 1, an embodiment of the invention is shown incorporated in an assembly which comprises a vibratory electric motor 10 and a compressor 11. Compressor 11 is of a known cylindrical shaped type that includes within the casing an intake valve (not shown) and a circular flexible diaphragm 12 (partially shown in FIG. 3) attached to the inner walls of the compressor casing and connected at its center to a boss 13. Compressed fluid leaves the casing 11 through an outlet nozzle 14 which is provided on the upper portion (FIG. 1) of the compressor casing 11. Nozzle 14 is adapted for connection to any suitable hose or tube (not shown) to any suitable device which utilizes compressed fluid. The drawing has been simplified so as to show only those parts of vibratory motor 10 and compressor 11 to illustrate an environment for the novel motion converting means which is to be hereinafter fully described. It should be understood that the hereinafter described application of the invention to a compressor is for purposes of illustration only inasmuch as the subject motion converting means finds ready application to many appliances which are operated by vibratory type electric motors.

Vibratory electric motor 10 includes a U-shaped stator 15 which is disposed between spaced inverted U-shaped frame plates 16 and 17 respectively (FIG. 2) formed of non-magnetizable material such as brass. Stator 15 includes a series of laminations 18 of magnetizable material and an energizing coil 19 is disposed around the base thereof. Stator 15 is secured to and between frame plates 16 and 17 by screws 20. Screws 20 pass through the legs of spaced frame plates 16 and 17 and stator laminations 18 and are then secured to the frame plates by nuts 21. Insulating spacer sheets 22 are disposed between the outermost laminations of stator 15 and the inner face of the frame plate against which they are disposed. The upper portions (FIG. 3) of the spaced legs of stator 15 are provided with arcuate pole faces 23.

An armature assembly 24, which includes two identical armatures 25 and 26 respectively, each mounted for independent oscillation on separate oilless sleeve bearings 27, is mounted on a fixed armature shaft 28. Shaft 28 has its opposite ends secured to the spaced frame plates 16 and 17, as shown in FIG. 4, and nonconductive washers 28A are disposed on shaft 28 between the two armatures 25 and 26 and between the armatures and their adjacent frame plates. Armatures 25 and 26 are each formed of a series of laminations 29 and each armature has a pair of arms 30 and 31 (FIG. 3) which extend outwardly in opposite directions from shaft 28. Laminations 29 of each armature are secured together by rivet pins 32 which extend through opposite arms 30 and 31 of each armature. Arcuate pole faces 33 are located at the outer ends of the arms 30 and 31 and which pole faces 33 correspond to stator pole faces 23 so that the arcs defined by pole faces 23 and 33 have centers coaxial with the axis of armature shaft 28.

In order to set armature pole faces 33 at an initial entry position adjacent their respective stator pole faces 23 so that the leading edge of each pole face 33 slightly overlaps a stator pole face 23 (FIG. 3), a pair of L-shaped brackets 35, one for each armature, are disposed beneath armature assembly 24. Each bracket 35 is mounted on the inner face of spaced frame plates 16 and 17 by means of screws 36. An elongated arcuate slot 37 is provided in the wall of each frame plate and through which screw 36 passes into the leg 38 of its bracket 35 (FIG. 4). A clamp 39 lies against the outer face of each frame plate and each screw 36 passes through clamp 39 before entering its slot 37. Clamps 39 have marginal portions engaged with its frame plate adjacent slots 37 whereby a bracket 35 is secured to its frame plate by the frictional engagement of the clamp 39 with the frame plate when screw 36 is tightened. A compression spring 40 is provided for each bracket 35 having one end thereof mounted on the foot 41 of the bracket and extends in a normal direction from foot 41 so that the other end of the spring engages the bottom (FIG. 3) of an arm 30 or 31 of the armature beneath which its bracket 35 is disposed. In FIG. 3 motor 10 is shown at its rest or start position. Each spring 40 engages only one arm of the armature with a spring 40 disposed at either side of the armature shaft 28 on their brackets 35. Arm 31 of armature 25 is engaged by a spring 40 and is raised, while arm 30 of armature 26 is elevated by its spring 40 on the other side of shaft 28. In this arrangement, as will be hereinafter described, armature 26 will oscillate in one direction and armature 25 in an opposite direction relative to stator 15. Brackets 35 are adjustable in arcuate slots 37 in order that armatures 25 and 26 may be set at varied entry postions relative to stator pole face 23 by movement of a bracket 35 along the inner face of the frame plate adjacent slot 37.

A pair of spaced arms 42 extend from each frame plate 16 and 17 (FIG. 5) with arms 42 of each pair of arms interconnected at their extremities by an integral flange 43 bent at a right angle away from the armature assembly 24. Compressor casing 11 is detachably mounted on flanges 43 by any suitable fastening means, as for example, by screws 44 which pass through openings 43A in each flange 43 and then into fittings (not shown) in the walls of the compressor casing 11.

A motion converting member, generally indicated by the reference numeral 45, is disposed between compressor 11 and armature assembly 24. Member 45 is formed of a nonconductive and nonmagnetizable material, such as a hard plastic, and has a main body portion having a flat wall portion 46. Rigid legs 47 and 48 depend from spaced end edges of wall portion 46 and each of the legs 47 and 48 terminate in curved bottom surfaces 49. Surface 49 of leg 47 engages the flat top surface of raised arm 31 of armature 25 and surface 49 of leg 48 engages the raised arm 30 of armature 26 (as seen in FIG. 3). A rod or output member 50 extends perpendicularly from or normal to wall 46 in a direction opposite to legs 47 and 48 from wall 46. Rod 50 projects into the compressor 11 through an opening 51 in the compressor casing and is threaded into a cavity (not shown) in boss 13 (FIG. 3) connected to diaphragm 12. Pairs of spaced ears 52 are provided on the opposite spaced longitudinal side edges of member 45 and each pair of ears 52 projects between pair of arms 42 of the adjacent frame plate 16 or 17 whereby member 45 is positioned on armature assembly 24 against lateral movement by the engagement of a side of each ear 52 with an arm 42. A compression spring 53 is disposed over rod 50 and has one end looped around the base of rod 50 to abut against wall 46 of member 45. The opposite end of spring 53 engages the bottom (FIG. 1) of compressor 11 adjacent opening 51 therein.

In assembly of the above described motor and compressor assembly, wherein one embodiment of the novel motion converting means has been illustrated, member 45 is mounted on armature assembly 24 prior to the attachment of compressor 11 to flanges 43 of spaced frame plates 16 and 17. After member 45 has been positioned on armature assembly 24, spring 53 is placed over rod 50 and which rod 50 is then inserted into compressor opening 51 and threaded into the boss 13 to unite diaphragm 12 to motion converting member 45. Screws 44 are then threaded into the compressor 11 through flanges 43 and compressor 11 is thereby secured to motor 10.

Compression spring 53 and armature springs 40 are placed under compression when compressor 11 is secured to motor 10 whereby armatures 25 and 26 assume their previously described start position (FIG. 3) relative to stator 15 and wherein surfaces 49 of legs 47 and 48 of member 45 are disposed in the same plane on armature assembly 24. Springs 40 and spring 53 are selected of such relative spring gradients so as to obtain a desired armature stroke when the motor is operated, as will be hereinafter described, and to maintain armatures 25 and 26 in the static or start position (FIG. 3) when the motor is at rest and in which position the forces exerted by the springs on the armatures are balanced.

In order to operate motor 10 the usual supply cord (not shown) is used having sockets for engagement with terminal projections 54 and a plug for connection with an electrical outlet whereby coil 19 is energized, as for example, by alternating current. Upon energization of coil 19 a magnetic pull is effected on armature pole faces 33 through stator pole faces 23. As the current rises armatures 25 and 26 will pivot in unison in opposite directions in the direction of stator pole faces 23, overcoming the balance created by springs 40 and spring 53 on armatures 25 and 26 in the static or start position, and will enter the area between the spaced legs of stator 15 to a limiting position designated by broken lines A and B in FIG. 3. As pole faces 33 are drawn to stator pole faces 23, springs 40 are further compressed and member 45 moves downwardly (FIG. 3) in a linear direction under the urging of spring 53 with the movement of the armatures. During this downward arcuate movement of armatures 25 and 26, spring 53 expands to maintain surfaces 49 of legs 47 and 48 of member 45 in constant sliding engagement with the top surfaces of their respective armatures. Ears 52 of member 45 travel along arms 42 of frame plates 16 and 17 preventing lateral movement of member 45 from its linear path as member 45 travels downwardly with armature assembly 24.

As the current wave recedes, springs 40 return armatures 25 and 26 in unison toward their start positions. During the return movement, armatures 25 and 26 drive member 45 upwardly (FIG. 3) in the same linear path traversed by member 45 during the downward movement thereof and recompress spring 53. In the motor illustrated and described it will be apparent that if the frequency of applied current is, for example, 60 cycles per second, armatures 25 and 26 will oscillate at the rate of 120 oscillations per second. A translatory reciprocating movement in a path normal to a tangent to an imaginary arc generated by the oscillation of armatures 25 and 26 is thereby transmitted to rod 50 through the translatory movement of member 45. As a result, boss 13 is moved by rod 50 to effect rapid reciprocation of compressor diaphragm 12 to compress fluid outwardly through nozzle 14.

It is apparent from the foregoing that the novel motion converting member 45 has many advantages in use. One advantage is that the member 45 is formed in one piece of premolded plastic whose legs 47 and 48 offer little friction and weight to the armature assembly 24 during oscillation of armatures 25 and 26. In addition, the member 45 is mounted directly on armatures 25 and 26 and transmits translatory motion to the output member 13, without the use of pins or crank arms. It will be understood by those skilled in the art that the novel drive mechanism is not limited to the motor and compressor illustrated and is adaptable to different types of vibratory motors and other small appliances such as electric toothbrushes or shavers where it might be desired that a translatory or linear motion be transmitted to a driven member such as a brush, cutter element or the like from the oscillatory motion of an armature assembly.

Although one embodiment of the present invention has been illustrated and described in detail, it is to be expressly understood that the invention is not limited thereto. Various changes can be made in the design and arrangement of parts without departing from the spirit and scope of the invention as the same will now be understood by those skilled in the art.

What is claimed is:

1. In a motor driven device of the class described,
   (a) a motor having a stator,
   (b) a shaft for said motor,
   (c) a pair of armatures disposed for oscillation on said shaft and concurrently movable in opposite directions,
   (d) an output member, and
   (e) means operatively connecting the output member with said pair of armatures to move said output member in a reciprocatory path, said output member including a point which moves along a line which intersects the axis of oscillation of said armatures.

2. In a motor driven device of the class described,
   (a) a vibratory electric motor having a stator provided with spaced pole faces and an oscillatory armature assembly,
   (b) said armature assembly having two armatures and each of said two armatures arranged for oscillation in opposite directions relative to said spaced stator pole faces,
   (c) output means disposed for reciprocatory movement in a path extending normal to a tangent to an imaginary arc generated by the oscillation of said said armatures, and
   (d) a motion converting member interposed between said armatures and said output means,
   (e) said motion converting means reciprocated by said armatures and including a point which moves along a line which extends normal to the axis of armature oscillation to transmit translatory movement to said output means from the oscillatory motion of said armatures.

3. In a motor driven device of the class described,
   (a) a vibratory electric motor having a stator provided with at least two spaced pole faces and an armature assembly mounted between said spaced pole faces for oscillation relative to said at least two spaced pole faces upon operation of said motor,
   (b) said armature assembly having two armatures and each of said two armatures arranged for concurrent oscillation in opposite directions relative to said spaced stator pole faces,
   (c) said two armatures having a common axis of oscillation,
   (d) an output member disposed for reciprocation in a first path extending normal to a tangent to an imaginary arc generated by the oscillation of said armatures,
   (e) a motion converting member interposed between said output member and said armature assembly,
   (f) said motion converting member having portions engaging each of said armatures and having other portions connected to said output member, and
   (g) resilient means engaging said motion converting member to maintain said member in sliding engagement with said armature assembly during oscillation thereof,
   (h) said motion converting member reciprocated in a second path and including a point which moves along a line which intersects the common armature axis during oscillation of said armatures to thereby convert the oscillatory movement of said armatures to translatory motion and effect said reciprocation of said output member.

4. The motor driven device of claim 3 wherein said motion converting member includes,
   (a) a main body portion having a wall portion disposed in a plane parallel to and spaced from said armature assembly, and
   (b) rigid legs depending from opposite spaced side edges of said wall portion with each leg having a surface in engagement with one of said two armatures of said armature assembly.

5. In a motor driven device of the class described,
   (a) a motor having a U-shaped stator provided with spaced pole faces on opposite legs thereof, and
   (b) said armature assembly having two armatures having a common axis of oscillation,
   (c) resilient means arranged on opposite sides of said common axis to support two armatures for concurrent oscillation in opposite directions relative to said stator pole faces,
   (d) an output member disposed for reciprocatory movement in a path extending normal to a tangent to an imaginary arc generated by the oscillation of said two armatures,
   (e) a motion converting member having portions engaging each of said armatures and having other portions connected to said output member, and
   (f) second resilient means engaging said motion converting member to maintain said member in sliding engagement with said armature assembly upon oscillation of said armature assembly,
   (g) said motion converting member adapted for reciprocatory movement in a second path and including a point which moves along a line which intersects the said common axis of oscillation of said two armatures whereby said output member is moved in the first path.

6. The motor driven device of claim 5 wherein said output member comprises a shaft integrally formed on said motion converting member.

7. The motor driven device of claim 5 wherein said motion converting member comprises,
   (a) a main body portion having a wall portion disposed in a plane parallel to and spaced from said armature assembly, and
   (b) said armature engaging portions of said member including rigid legs depending from opposite spaced side edges of said wall portion with said legs having curved surfaces each engaging one of said two armatures.

(References on following page)

References Cited by the Examiner

UNITED STATES PATENTS

| | | | |
|---|---|---|---|
| 2,027,879 | 1/1936 | Piscionere | 103—53 |
| 2,666,153 | 1/1954 | McHenry et al. | 103—53 X |
| 2,994,792 | 8/1961 | Parker | 103—53 X |
| 3,086,133 | 4/1963 | Tolmie | 310—37 X |

FOREIGN PATENTS 261,886   7/1913   Germany.

ORIS L. RADER, *Primary Examiner.*

MILTON O. HIRSHFIELD, C. W. DAWSON,
*Assistant Examiners.*